J. E. LOVE.
CREAM DIPPER.
APPLICATION FILED DEC. 26, 1916.
1,253,612.
Patented Jan. 15, 1918.
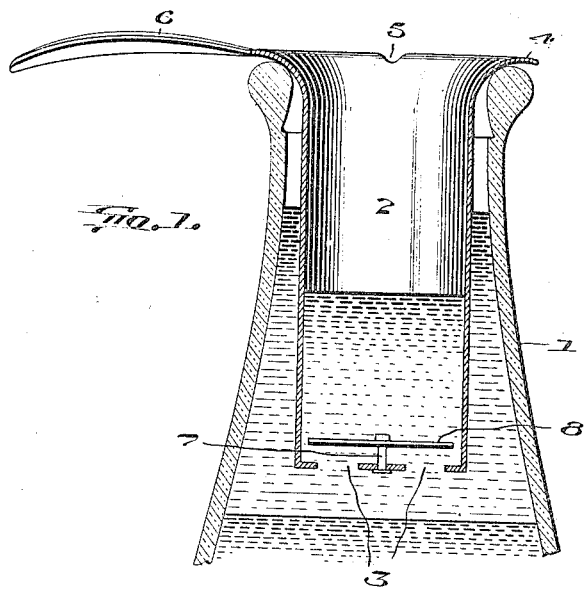
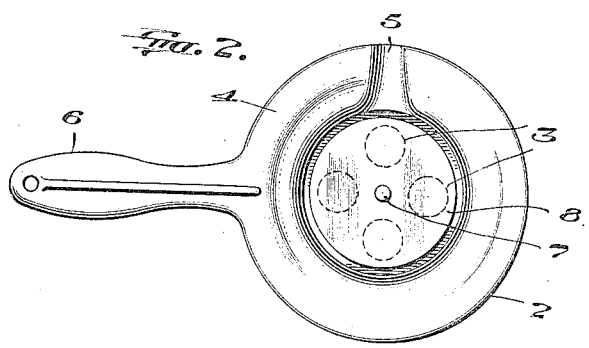
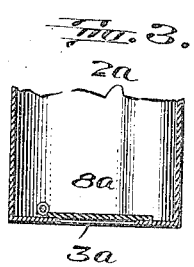

UNITED STATES PATENT OFFICE.

JAMES E. LOVE, OF WOONSOCKET, RHODE ISLAND.

CREAM-DIPPER.

1,253,612.  Specification of Letters Patent.  Patented Jan. 15, 1918.

Application filed December 26, 1916. Serial No. 138,832.

*To all whom it may concern:*

Be it known that I, JAMES E. LOVE, a citizen of the United States, residing at Woonsocket, in the county of Providence and State of Rhode Island, have invented new and useful Improvements in Cream-Dippers, of which the following is a specification.

My present invention pertains to means for separating and removing cream from milk in bottles, jars and the like; and it consists in the simple, efficient, easily operated and readily cleaned device, hereinafter described and definitely claimed.

In the accompanying drawings, which are hereby made a part hereof:

Figure 1 is a vertical, diametrical section showing my novel separating and extracting dipper as properly positioned in the mouth and neck of a milk bottle.

Fig. 2 is a plan view of the same, showing by dotted lines the configuration of the openings in the bottom of the tubular body of the dipper.

Fig. 3 is a detail vertical section, showing a modified valve that may be used in lieu of the valve in Figs. 1 and 2, in the discretion of the manufacturer.

Referring by numeral to the said drawings, and more particularly to Figs. 1 and 2, thereof;

1 is a milk bottle, and 2 is the tubular body of my novel extracting dipper. The said body is provided in its bottom, about the center thereof, with apertures 3 which are preferably round or oval, see dotted lines in Fig. 2, so as to offer no corners or angles which are liable to become foul from collected sediment. The upper end of the said body 2 is flared, as indicated by 4, to afford a supporting flange, and is provided with a pouring spout 5, and a lateral handle 6.

Fixed to and rising from the center of the bottom of the body 2 is a guide stem 7, and mounted and movable vertically on said stem is a horizontal valve 8 which has for its function to retain the extracted cream in the body 2 when the dipper is lifted from the bottle.

In the practical use of my novel dipper, the same is grasped by the handle 6, and the body 2 is let down in the mouth and neck of the bottle 1, containing milk and a strata of cream thereon. When this is done, the cream rises and passes the valve 8 and occupies the body 2 in the manner illustrated in Fig. 1. Then when the dipper is lifted from the bottle, the weight of the cream closes the valve 8 and keeps the same closed so that there is no liability of any of the cream being lost through the lower end of the body 2 during the movement of the dipper and incidental to the pouring of the cream from the same.

In the modification shown in Fig. 3, a clack valve 8ª, is used in lieu of the valve 8, of Figs. 1 and 2, to control a single opening 3ª in the bottom of the body 2ª.

It will be appreciated from the foregoing that my novel dipper is simple and inexpensive in construction, adapted to be conveniently manipulated, and susceptible of being thoroughly cleaned by the pouring of hot water through the same; also, that when nickel-plated or otherwise embellished, the dipper is calculated to constitute an elegant and attractive table article.

Having described my invention, what I claim and desire to secure by Letters Patent, is:

A cream dipper comprising a tubular body, of circular form and a size in cross-section to rest in the neck of a milk bottle, and having an opening in its bottom and an upwardly-opening valve controlling said opening and also having its upper end flared and forming a supporting flange adapted to bear on the upper end of the neck of the milk bottle and further having a pouring spout in said flange, and a handle integral with and extending laterally from said flange and disposed at right angles to said spout.

In testimony whereof I have hereunto set my hand in presence of two subscribing witnesses.

JAMES E. LOVE.

Witnesses:
 EDGAR L. SPAULDING,
 EVELYN W. SPAULDING.